Nov. 20, 1923.
E. J. HUFFMAN
TRUCK COUPLING
Filed Nov. 8, 1920
1,474,477
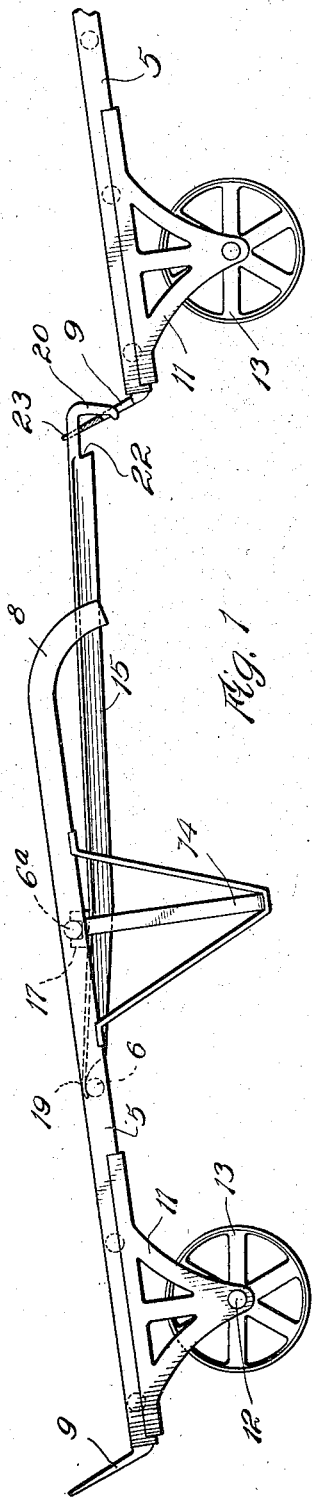
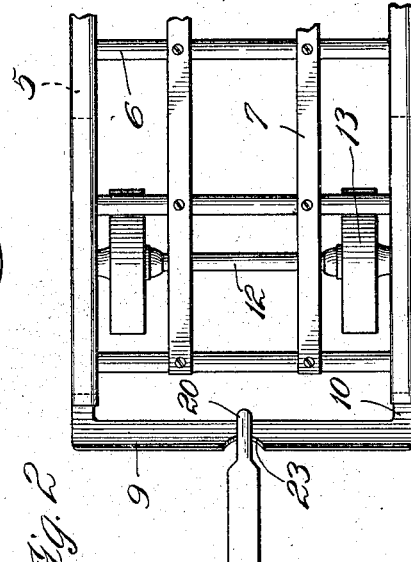
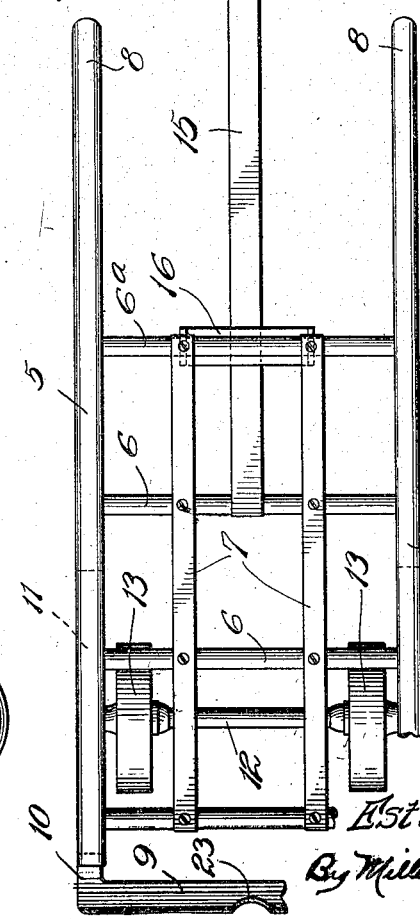
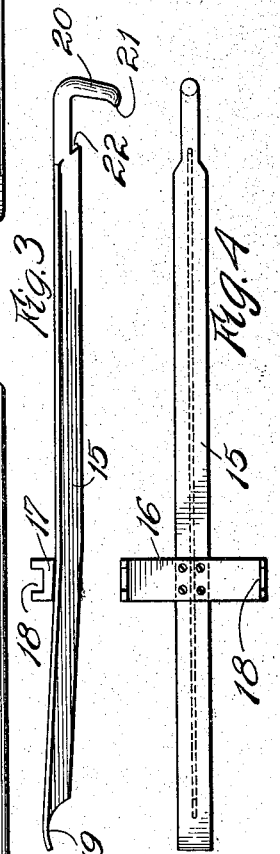
Inventor
Estil J. Huffman Patented Nov. 20, 1923.

1,474,477

UNITED STATES PATENT OFFICE.

ESTIL J. HUFFMAN, OF CHICAGO, ILLINOIS, ASSIGNOR TO SEARS, ROEBUCK AND CO., A CORPORATION OF NEW YORK.

TRUCK COUPLING.

Application filed November 8, 1920. Serial No. 422,450.

*To all whom it may concern:*

Be it known that I, ESTIL J. HUFFMAN, a citizen of the United States, residing at Chicago, in the county of Cook and State of Illinois, have invented certain new and useful Improvements in Truck Couplings, of which the following is a specification.

The invention relates to draft couplings for hand trucks.

The object of the invention is to provide simple, durable and cheaply constructed means for connecting hand trucks of the two-wheel type in trains for movement by a single unit of motive power.

The handling of goods in warehouses and freight transfers requires a great amount of hand trucking. The lots of merchandise being moved from one floor area to another, or in and out of cars, are commonly picked up on a two-wheel hand truck having a frame with rigid handles and an upwardly projecting blade or end rest fixed across the end of the frame oppositely to the handles. By tilting the truck on its axle, the end rest may be lowered to the floor and pushed under a package or tiered pile of merchandise. Upon manually depressing the handles, the load may be tipped onto the frame where it is supported on being raised by the end rest, and the truck wheeled to the desired location.

The great advantage of the two-wheeled hand truck as compared with a stabilized truck having three or four wheels is that the former is not restricted as to turning radius and may be maneuvered in narrow aisles and about sharp corners where other vehicles could not be used.

Heretofore, the use of the two-wheel truck has required a man to each truck to move them about, it being necessary to support the truck on a single axle with its load substantially balanced over the wheels and its usual stationary leg support lifted clear of the floor. A great saving of time and labor frequently is possible when, having loaded a number of trucks which must be moved a considerable distance through comparative clear aisles, it is possible to couple a train of such trucks together and draw them by a single unit of mechanical power.

Obviously a number of such trucks could not be connected together by the ordinary link couplers for movement in a train without adding a third wheel or a pair of wheels to support the handle end of the truck platform.

It is the particular object of my invention to provide means by which the standard two-wheel hand trucks can be coupled in trains without reconstruction and still preserving all of the advantages of that type in their separate use. I attain this object by employing a rigid coupling bar which is arranged to lift and support the handle end of the truck frame by means of resting the bar in flexible engagement upon the end rest on a leading truck.

In the accompanying drawings, I have illustrated a preferred embodiment of my invention but it is to be understood that in the interpretation of the appended claims they are not to be limited to the precise construction or arrangement set forth except as may be necessitated by the state of the prior art.

In the drawings, Figure 1 represents in elevation a two-wheel hand truck of the type described coupled by means of my invention to a similar truck being drawn ahead of it. Fig. 2 is a plan view of the hand truck, coupling bar and a portion of the leading truck. Figs. 3 and 4 represent respectively a side elevation and plan view of the coupling bar.

Referring to Figs. 1 and 2, the hand truck illustrated comprises a load platform or frame having side stiles 5 connected by cross members 6 and 6ª upon which are supported longitudinal straps 7 for supporting the load. The side stiles 5 are extended to form at their ends a pair of curved handles 8. At the opposite end of the platform is an end rest 9 shaped with a cross section tapering toward the outer edge of the blade and having angular arms 10 formed at its ends to secure it to the side stiles of the frame. When the truck is in horizontal position, the end rest 9 extends upwardly at such an angle to the bed of the frame that when the latter is tilted forward to its extreme position the end rest lies flat upon the floor. The frame is supported at one end upon brackets 11 carrying an axle 12 upon which are journaled a pair of wheels 13. The rearward or handle end of the truck carries a depending leg 14, of any suitable construction, which rests upon the floor to support that end of the frame when the latter is in horizontal position.

The preferred embodiment of my invention comprises a bar 15 preferably constructed from solid stock of T-shaped cross section having the central web extending downwardly. Located rearwardly on the bar is a cross plate 16 rigidly secured to the bar and having upturned ends 17 in which are cut vertical notches 18. At the rearward end of the bar the depending web is cut away and the upper flange is curved downwardly as at 19, and of suitable shape to engage one of the cross members 6. The forward end of the bar is formed with a hook 20 extending downwardly and having a backwardly projecting lip 21 at its extreme end. To the rearward of the hook the depending web is cut away to form a shoulder 22 facing toward the hook.

To couple up the hand trucks for movement in trains, the coupling bar is positioned upon the trailing truck by engaging the rearward end 19 over one of the inner cross members 6 and positioning the cross plate 16 beneath the end cross member 6$^a$ which is engaged by entering it in the notches 18. The forward end of the coupling bar is hooked over the end rest 9 carried by a similar leading truck. A recess 23 is cut in the end rest to receive the shank of the hook. The length and longitudinal shape of the bar is arranged so that when the bar is in position and two trucks coupled in the manner illustrated, the handle end of each truck will be lifted sufficiently to raise the supporting leg 14 clear of the floor.

In operation the coupling bar is rigidly attached as to lateral movement in its relation to the trailing truck while its connection with the leading truck is a flexible one permitting the relative swinging of the two coupled trucks. In their movement in trains, the draft pull is taken upon the hook 20 and the distance between the trucks is preserved by the engagement of the shoulder 22 with the end rest 9 of the leading truck. By coupling the series of trucks to a unit of locomotive power, the entire train may be moved without other attention to the truck than that required in coupling the train.

It will now be apparent that I have provided simple, durable means for connecting standard hand trucks in trains for transportation, and that by the use of my invention a great amount of labor heretofore required in the separate handling of the trucks, may be saved.

I claim as my invention:

1. In a train of hand trucks, the combination of a coupling bar adapted to extend longitudinally between two trucks in contiguous relation and having a detachable connection with one of said trucks, and a flexible connection with the other, said bar having a single cross member thereon serving the double function of preventing longitudinal movement of the bar with respect to one of the trucks and to support the weight of the same, said bar by its connection with the other truck being arranged to transmit thereto part of the weight of the former truck.

2. In a hand truck having a single wheel-carrying axle and a frame mainly supported thereon, a separable draft coupling comprising a bar having a single means whereby to be detachably mounted on and to serve as a draft connection for the bar with said frame, and said bar having means adapted to provide a detachable pivotal connection with a drawing unit, said bar being thereby adapted to partially support said frame and steer said truck in its movement.

3. In a train of hand trucks, each truck having two wheels and a frame carried thereon having cross members, a coupling bar rigidly mounted on one of said frames having an end secured over one of said cross members and extending beneath another of said cross members whereby to partially support said frame, the other end of said bar being supported upon and having a flexible draft connection with another of said trucks.

4. In a train of hand trucks wherein each truck is provided with two wheels and a frame carried thereon comprising cross members, a coupling bar arranged with respect to the cross members of a truck so that an end exerts pressure downwardly on one cross member and extends past another cross member and exerts pressure thereon upwardly, the free end of said bar being supported upon and having a flexible draft connection with another of said trucks.

5. In combination with a hand truck having a frame including cross members, a draft coupling comprising a bar having its inner end engaged over an inner cross member, said bar extending outwardly beneath another cross member nearer the end of the truck, a cross plate fixed on said bar having upturned recessed ends adapted to embrace the last mentioned cross member, and a hook formed on the outer end of said bar adapted to engage a drawing unit for moving said truck.

6. A draft coupling for hand trucks comprising a bar, a plate mounted transversely of said bar having upwardly projecting bifurcated ends to prevent movement of the bar relative to one of two coupled trucks, a downwardly projecting coupling hook formed on the outer end of said bar, and a shoulder on said bar rearwardly of and facing said hook to prevent movement of the bar relative to the other of two coupled trucks.

7. In combination with a hand truck having a frame supported mainly on a single axle carrying wheels, a coupling bar rigidly mounted on said frame and adapted to partially support said frame by engagement with a drawing unit and having means to prevent longitudinal movement of said bar relative to either the frame or drawing unit, and an end rest mounted on said frame, said end rest being adapted to receive and support the coupling bar of a similar truck being drawn thereby and having a recess formed in one edge thereof to prevent movement from side to side of said coupling bar relative to said end rest.

8. In combination with a hand truck having a frame including cross members and an end rest mounted on the frame, a draft coupling comprising a rigid bar having its rearward end shaped to overlie one of said cross members, a cross plate fixed on said bar having upturned bifurcated ends arranged to underlie and embrace another of said cross members, a downwardly projecting hook formed on the outer end of said bar adapted to engage and be supported upon the end rest of another truck, and a shoulder formed on said bar rearwardly of said hook arranged to limit the longitudinal movement of said bar upon said end rest.

9. A train comprising a leading vehicle, a hand truck having two wheels near one end and two handles at opposite sides of the other end of the truck, and a supporting and coupling bar bearing against members extending crosswise of the truck at a plurality of points forward of the wheels of said truck, said bar being approximately in the longitudinal median plane of the truck and having a hook at its forward end detachably engaging the rear portion of the leading vehicle.

In testimony whereof, I have hereunto set my hand.

ESTIL J. HUFFMAN.